United States Patent [19]
Resler, Jr.
[11] 4,132,209
[45] Jan. 2, 1979

[54] METHOD AND MEANS FOR REDUCING POLLUTANTS FROM THE EXHAUST OF HYDROCARBON FUEL COMBUSTION MEANS

[75] Inventor: Edwin L. Resler, Jr., Ithaca, N.Y.
[73] Assignee: Cornell Research Foundation Inc., Ithaca, N.Y.

[21] Appl. No.: 770,353
[22] Filed: Feb. 22, 1977

Related U.S. Application Data

[63] Continuation of Ser. No. 449,391, Mar. 8, 1974, abandoned, which is a continuation-in-part of Ser. No. 399,498, Sep. 21, 1973, abandoned.

[51] Int. Cl.[2] ........................ F02P 13/00; F01N 3/16; B01D 53/34; B01J 1/14
[52] U.S. Cl. ........................ 123/169 R; 123/169 V; 60/274; 60/282; 60/301; 423/212; 423/235; 431/8; 422/16 P
[58] Field of Search ........... 123/32 SP, 32 ST, 143 B, 123/143 R, 169 R, 169 V; 60/274, 303, 284, 282, 301; 423/212, 235; 23/277 C; 431/2, 8

[56] References Cited

U.S. PATENT DOCUMENTS

| | | | |
|---|---|---|---|
| 1,258,117 | 3/1918 | Ireland | 123/143 B |
| 1,523,731 | 1/1925 | Stewart | 123/143 B |
| 2,673,554 | 3/1954 | Thaheld | 123/32 E |
| 3,370,914 | 2/1968 | Gross et al. | 60/301 |
| 3,867,507 | 2/1975 | Myerson | 60/274 |
| 3,873,671 | 3/1975 | Reed et al. | 423/235 |
| 3,894,141 | 7/1975 | Moser | 423/235 |
| 3,908,371 | 9/1975 | Nagai et al. | 60/301 |
| 3,926,169 | 12/1975 | Leshner et al. | 123/143 B |

*Primary Examiner*—Charles J. Myhre
*Assistant Examiner*—Andrew M. Dolinar
*Attorney, Agent, or Firm*—Lawrence E. Laubscher; Ralph R. Barnard; Theodore C. Wood

[57] ABSTRACT

Method and apparatus for reducing the nitrogen oxide component from the oxygen-poor combustion products of a hydrocarbon fuel combustion device, which product would ordinarily contain an undesirable excess quantity of oxides of nitrogen. The method and apparatus include the means for associating gaseous hydrocarbon compounds in said products of combustion at a sufficiently high temperature in a related selected contained volume such that a degree of acceleration of the reduction of oxides of nitrogen is obtained so that the NO is reduced to an acceptable level within a selected reaction time related to said volume which reaction time, volume and temperature are reasonably associated with or present within said combustion device.

25 Claims, 22 Drawing Figures

Fig. 6
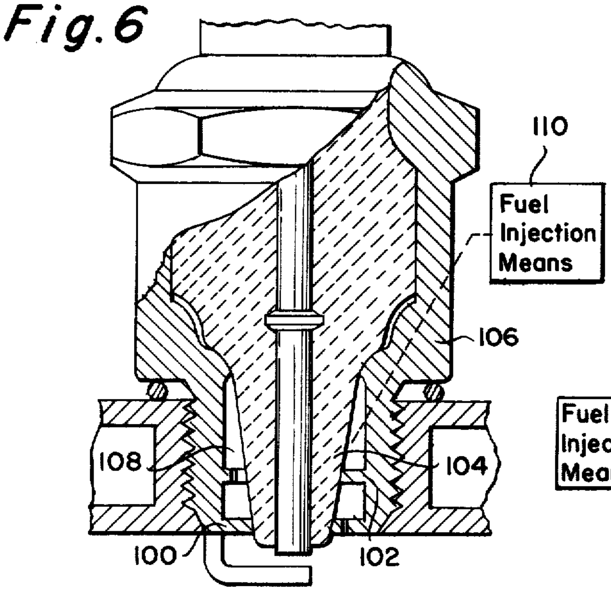
Fig. 7
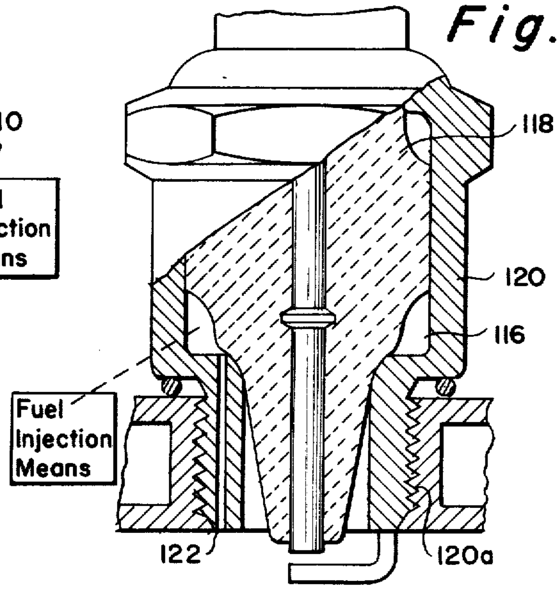
Fig. 8
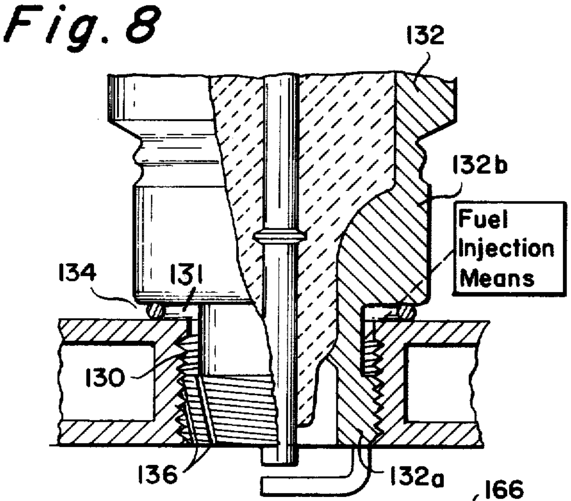
Fig. 9
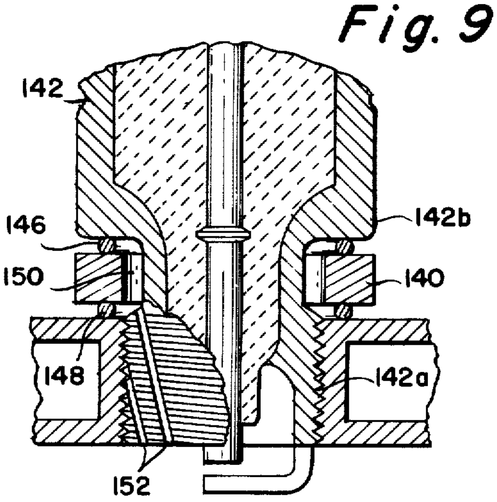
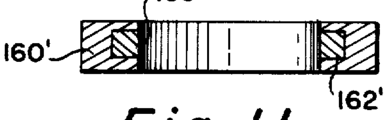
Fig. 11
Fig. 10
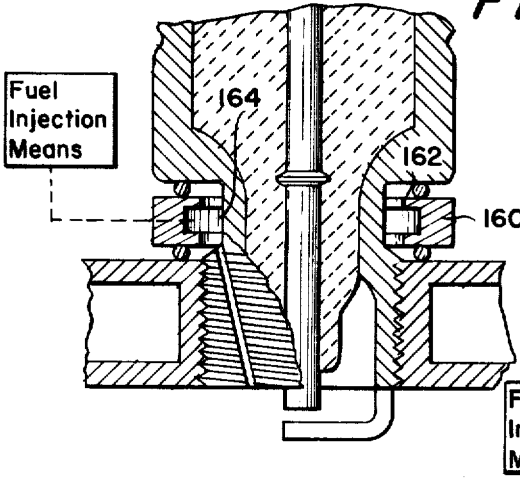
Fig. 12
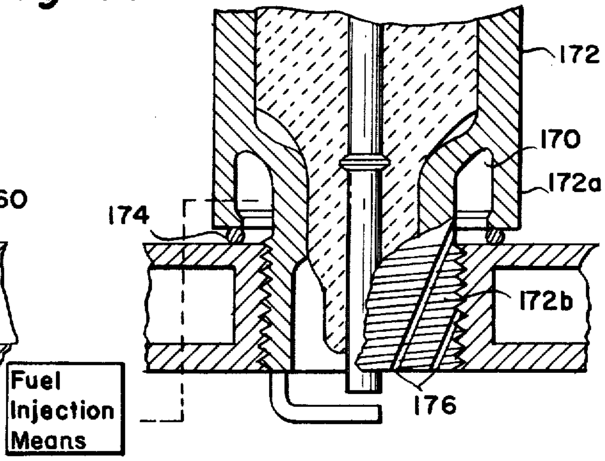

METHOD AND MEANS FOR REDUCING POLLUTANTS FROM THE EXHAUST OF HYDROCARBON FUEL COMBUSTION MEANS

This is a continuation, of application Ser. No. 449,391 now abandoned, filed Mar. 8, 1974, which in turn is a continuation-in-part application Ser. No. 399,498 filed Sept. 21, 1973 (now abandoned).

In recent years, numerous attempts have been made to produce an efficient and relatively inexpensive low pollution exhaust improvement apparatus for use with a source of exhaust from hydrocarbon fuel combustion. In this regard, pollution due to automotive vehicles has been the subject of extensive legislation, and the automotive industry is now attempting to comply with the law in their designs and to meet ultimately the pollution-control standards.

As a background to this type of pollution problem it is known that when an internal combustion engine operates in the fuel-lean mode, the combustible hydrocarbon and carbon monoxide pollutant concentrations in the exhaust are relatively low, while for fuel-rich operation, the concentrations of these pollutants are relatively high. On the other hand, the noxious oxides of nitrogen are a maximum when the internal combustion engine is operated near the correct fuel-to-air ratio, but are much reduced when the engine is operated either in the fuel-rich mode or in the fuel-lean mode. A comprehensive discussion of the problems of pollutant control is presented in the article "How Clean a Car", John B. Heywood, *Technology Review*, Volume 73, Number 8, June, 1971, Alumni Association of the Massachusetts Institute of Technology.

Prior art solutions to the problem of unwanted pollutants have not been able to utilize a fuel-lean mode for a satisfactory solution to the total problem because engine performance is impaired assuming the engine will start and run at all. On the other hand, the prior art has leaned heavily upon the fuel-rich mode of operation of internal combustion engines in order to minimize these problems, for example, the problem of noxious oxides of nitrogen could be minimized by the selection of a fuel-rich mode which is in the neighborhood of 1.2–1.3 times a stoichiometric fuel/air ratio which results in excess hydrocarbon and carbon monoxide pollutant concentrations in the exhaust which could, in turn, be removed from the exhaust by several devices identified as either a thermal reactor or a catalytic converter designed for that purpose. These techniques have resulted in generally lower pollutant levels in the exhaust of automobiles and similar engine driven devices usually at the expense of fuel economy. As time has passed, environmentalists, including governmental legislation and regulation, have mandated lower pollutant levels in exhaust systems creating a need for improved pollution control tantamount to substantially eliminating the hydrocarbons and the carbon monoxide and NO from the exhaust of these engines and, in particular, the noxious oxides of nitrogen are to be reduced to a level substantially below the 1970 level (a reduction of 90%) by 1977.

The squeeze on the world's technological capability is primarily related to a practical means for reducing the inherent oxides of nitrogen that are formed in the high temperature gaseous environment of working cylinders of the internal combustion engine. Many researchers assigned to study and solve this problem have urged the use of what is known as catalytic converters for the purpose of treating the exhaust of an internal combustion engine. These are used first to accomplish a reduction in the oxides of nitrogen through the use of a catalytic reducing converter and then to accomplish a reduction of hydrocarbons and carbon monoxides through either a thermal reactor or a catalytic oxidizing converter. A representative discussion of these techniques is disclosed in the following publications:

1. Publication entitled *Search*, by the General Motors Research Laboratories, Vol. 8, No. 4, dated July–August, 1973.
2. Article entitled "Exhaust System Passing Toughest Federal Tests", *Machine Design*, Nov. 2, 1972, pp. 34–38.
3. Article entitled "Calculation of Equilibrium Composition of Automotive Exhaust Gases" by Remo del Grosso, *Ind. Eng. Chem. Process Des. Develop., Vol.* 12, No. 3, 1973, pp. 390–394.

From a reading of these publications representative of the state of knowledge on the use of catalytic converters, it will be clear that the catalytic converter used to control NO is dependent upon continued operation of the internal combustion engine at a fuel-air ratio which continues to be richer than stoichiometric, so that it is oxygen poor which in turn creates an abundance of CO and $H_2$ in the exhaust to be treated in the catalytic converter, as well as a reasonably low NO level, which is further reduced by passing of the exhaust into a chamber containing a catalyst usually of the platinum group metal type or the base metal type arranged for optimum interaction between the surface of the catalyst and the exhaust gases and providing a substantial number of mechanical as well as chemical reliability problems. As these articles indicate, the catalyst has the function of accelerating the chemical reaction processes in which the oxides of nitrogen are reduced to $N_2$, etc. If the engine is not run on a rich fuel-air ratio, the NO catalyst is ineffective because the exhaust mixture is no longer reducing in nature. Moreover, it has been ascertained that the present quality of many of the gasoline fuel products available in this country contain poisons which are harmful for the various types of catalytic converters now known. This has led governmental agencies to consider the need for specifying the 1975 vintage gasoline product in terms of both lead and phosphorus content. Otherwise, the catalytic converter as it is known in the prior art cannot provide a practical and reliable alternative solution to the problem of lowering of the pollutants of the exhaust of the internal combustion engine to the levels which governmental regulations dictate. Moreover, the catalytic converter for reducing pollutants in exhaust gases has a built-in warm up time problem. While the NO level of the engine exhaust is relatively low because of the rich mixture used during warm-up both the CO and the HC are at a very high level during this period and the primary control device for the HC and CO, being downstream from the engine and NO converter, is shielded by the catalytic NO converter (which contains a large amount of catalytic surface) which initially cools the exhaust gases before they enter said primary control device (the second converter). Thus before the HC and CO can be controlled by the second converter the surfaces in the first converter must be brought to the proper operating temperature. Solutions to this warm up problem create system complications having a material effect on the reliability of the catalytic converter approach to these kinds of problems.

It is not clear that the catalytic converter approach can satisfy the reliability requirements of the Federal regulations mandating that emission control systems of automobiles, for example, meet emission regulations for five years or 50,000 miles of vehicle operation.

Accordingly, it is a primary object of the present invention to provide a new and improved method and means for controlling the pollutants exhausted from hydrocarbon fuel combustion.

It is still another object of the present invention to provide a new and improved method and means for reducing the undesired oxides of nitrogen, carbon monoxide and/or hydrocarbons exhausted from an internal combustion engine.

It is still another object of the present invention to provide a new and improved method and means of accelerating the reduction of the oxides of nitrogen in the exhaust of the internal combustion engine by maintaining said exhaust at a particular composition in a temperature range which accelerates such a reduction reaction so that it occurs in a short time period related to said temperature.

It is still another object of the present invention to provide a new and improved method and means of accelerating the reduction of the oxides of nitrogen by introducing unburned hydrocarbon fuel into an oxygen starved (rich) product of combustion which accelerates the reduction of NO and at a sufficiently high temperature the acceleration results in a usefully short time, for example, in the range of 2200°-2600° Rankine the related times are approximately 100 - 10 milliseconds.

It is still another object of the present invention to provide a new and improved method and means for reducing the oxides of nitrogen in the products of combustion of an internal combustion engine by subjecting said gases to a temperature-time-composition environment sufficient to reduce said oxides of nitrogen without the presence of a catalyst and at the same time maintain said exhaust at a temperature and composition which when such is then combined with air in a thermal reactor the temperature range of the exhaust gas therein is such that its carbon monoxide is rapidly converted to carbon dioxide and its hydrocarbon combustion products are converted to water and carbon dioxide all in a time span which is too short to cause the unwanted regeneration of oxides of nitrogen.

It is another object of the present invention to provide a new and improved method and means for reducing the oxides of nitrogen in the products of combustion of an internal combustion engine by equipment which because of its primary reliance on temperature-time-composition environment of gases is not subject to reliability limitations of either a mechanical or chemical nature arising out of the required use of hot catalytic surfaces or walls.

It is an additional object of the present invention to provide a new and improved method and means for reducing the pollutants, the oxides of nitrogen, carbon monoxide and hydrocarbons, in the products of combustion of internal combustion engines which is not critically dependent upon the specification of low phosphorous and/or low lead composition of the fuel different than that which is available in the marketplace today.

It is an additional object of the present invention to provide a new and improved method and means for reducing the pollutants, the oxides of nitrogen, carbon monoxide and hydrocarbons, in the products of combustion of internal combustion engines which does not necessarily require running the internal combustion engine at any prescribed fuel-to-air ratio.

It is an additional object of the present invention to provide a new and improved method and means for reducing the oxides of nitrogen by introducing into the products of combustion in each working cylinder after the piston passes top dead center during the expansion stroke unburned hydrocarbons, thereby reducing the oxides of nitrogen while the exhaust products are still in the working cylinder.

It is still another object of the present invention to provide a new and improved method and means for reducing the oxides of nitrogen by introducing an element within the working cylinder of an internal combustion engine in the clearance space above the piston in the path of the products of combustion during the exhaust stroke to be heated by the combustion products and, in combination with the HC compounds scraped from the walls of the working cylinder during the exhaust stroke, create the time-temperature-composition environment which will reduce the noxious oxides of nitrogen.

The objects of the present invention are accomplished through the teachings of the present invention which in essence utilize a heretofore unused characteristic of gaseous products of combustion containing high levels of the oxides of nitrogen in the presence of an excess of hydrocarbon compounds all in a relatively oxygen-starved mixture wherein the oxides of nitrogen will be accelerated towards their equilibrium condition. The teachings of the present invention can take materially different forms. In one instance the products of combustion of the working cylinder are passed into the exhaust system thereof and delivered to an NO reducing chamber wherein the gaseous products contain at least the HC compounds not burned in the working cylinder because of their proximity to cooled cylinder walls which gaseous HC compounds function to accelerate the excess oxides of nitrogen toward their equilibrium condition and at the same time said gaseous mixture is subjected to a heat source which raises the temperature of said gaseous products to further accelerate said oxides of nitrogen to their equilibrium condition and the temperature of said products of combustion is raised such that the oxides of nitrogen will be reduced to an acceptable level within a reaction time and within a volume which is reasonably associated with the combustion device. For example, a time period of 10–100 milliseconds is sufficient to reduce the NO content when at a related temperature range of approximately 2600°-2200° Rankine respectively and at a pressure of one atmosphere. The exhaust is then of a temperature high enough that air may then be added thereto so that a rapid thermal reaction is obtained reducing the unwanted carbon monoxide to carbon dioxide and the unwanted hydrocarbons to water and carbon dioxide, all in a time span which is too short to cause the unwanted regeneration of oxides of nitrogen.

In the other instance, the working chamber of the cylinder producing the undesired oxides of nitrogen is used as a reduction chamber during the expansion stroke of the piston following its passage through top dead center by making available to the combustion products a selected amount of hydrocarbons in gaseous form at a time when the temperature within said gaseous exhaust products is already at an appropriate reducing temperature matched to the volume and time period of the working cylinder during the expansion stroke. In this instance, if the combustion products are not oxygen poor at the time the hydrocarbons are added, the first hydrocarbons initially produce such a condition as an intermediate step wherein the remaining hydrocarbon gases then function to reduce the oxides of nitrogen as aforesaid.

In still another instance, the working chamber of the cylinder producing the undesired oxides of nitrogen is used as a reduction chamber during the exhaust stroke of the piston by using the unburned HC compounds scraped from the walls of the working cylinder during the exhaust stroke and heating the oxygen-starved exhaust mixture by passing it over a hot uncooled surface in the exhaust path within the clearance volume of the working chamber, which hot surface is heated by the combustion products.

In accordance with a more specific object of the invention, the hydrocarbon fuel combustion device is initially operable to produce a fuel-lean combustion product having oxides of nitrogen and an excess of oxygen. As a preliminary step, there is supplied to at least a portion of the fuel-lean combustion product a quantity of unburned hydrocarbon compounds sufficient to remove the excess oxygen and thereby render the resultant combustion product oxygen-poor.

Other objects and advantages of the present invention will become apparent from a study of the following specification when viewed in the light of the accompanying drawings in which.

Figure 5A:
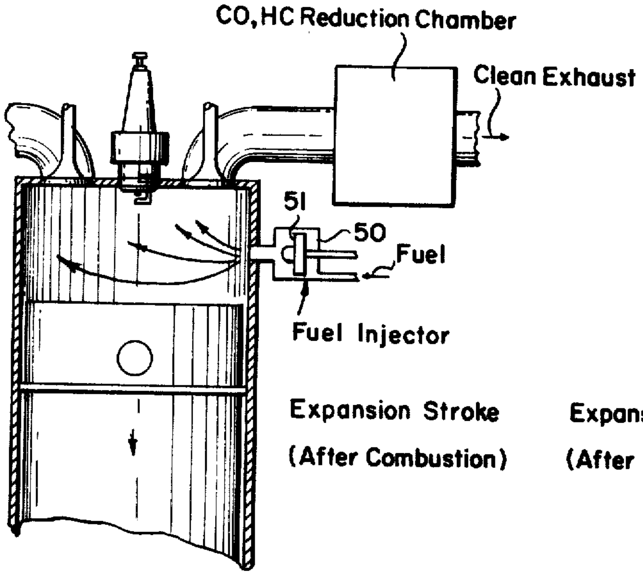
Figure 5B:
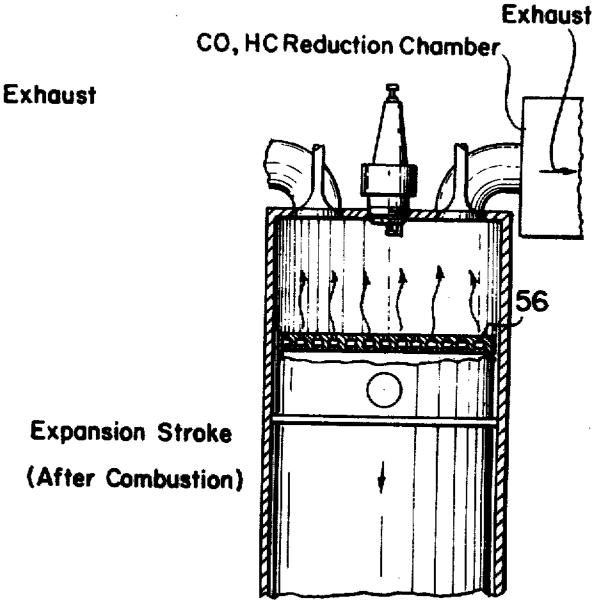
Figure 5C:
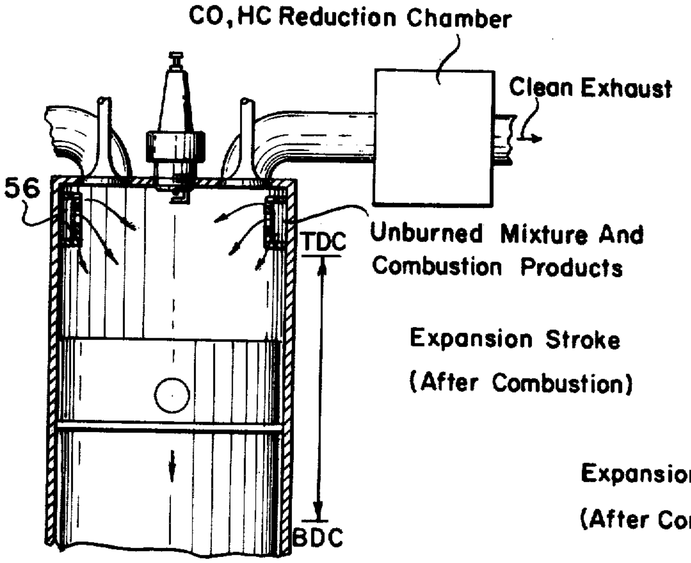
Figure 5D:
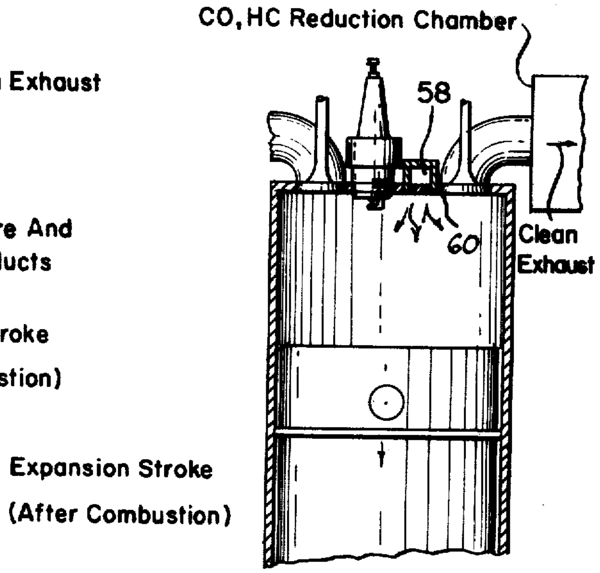
Figure 5E:
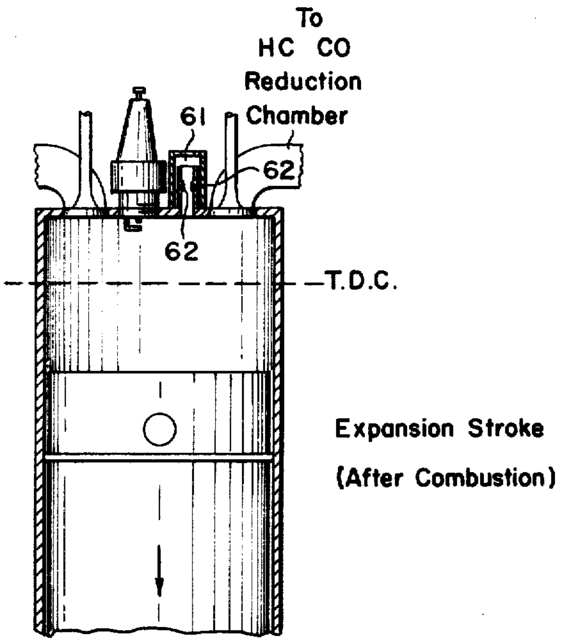
Figure 5F:
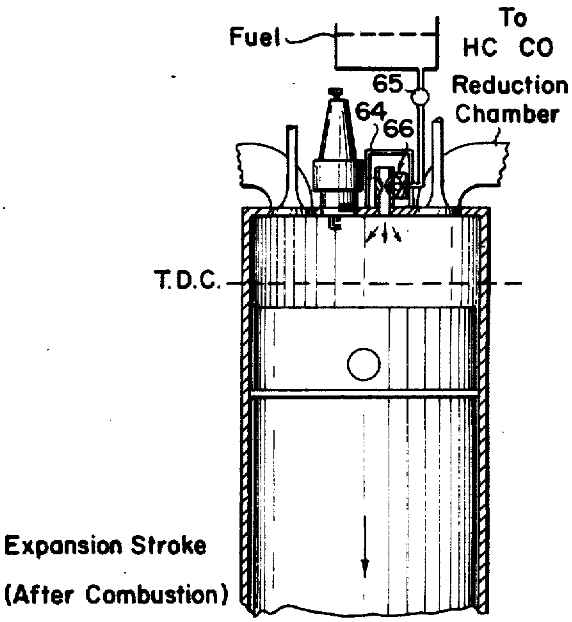
Figure 5G:
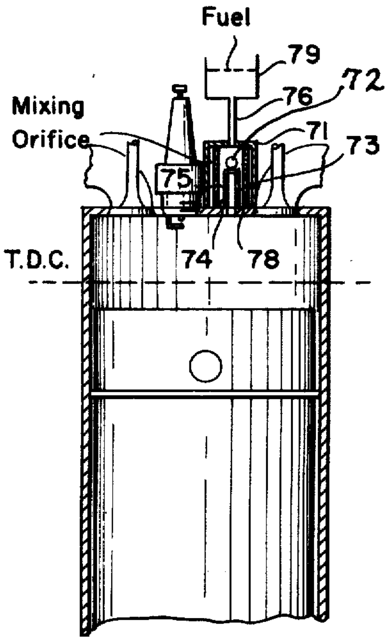
Figure 5H:
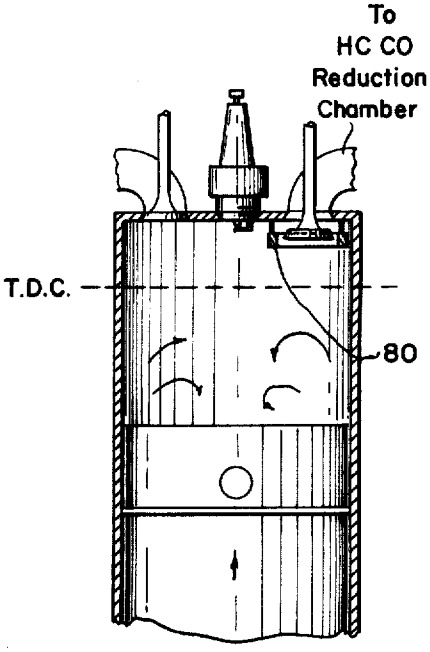
Figure 5I:
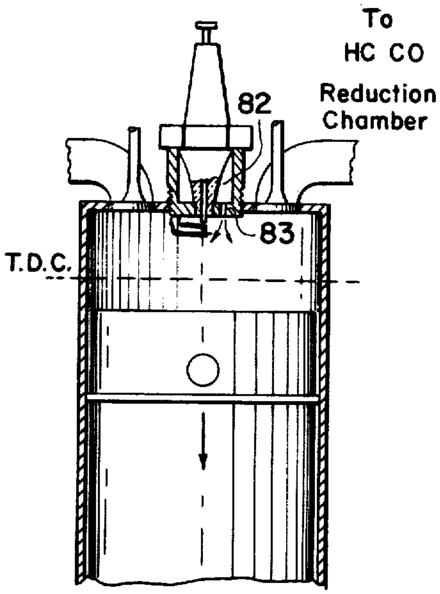
Figure 5J:
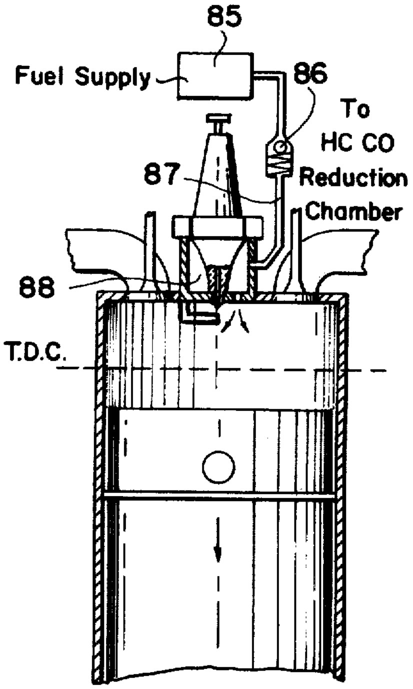
Figure 5K:
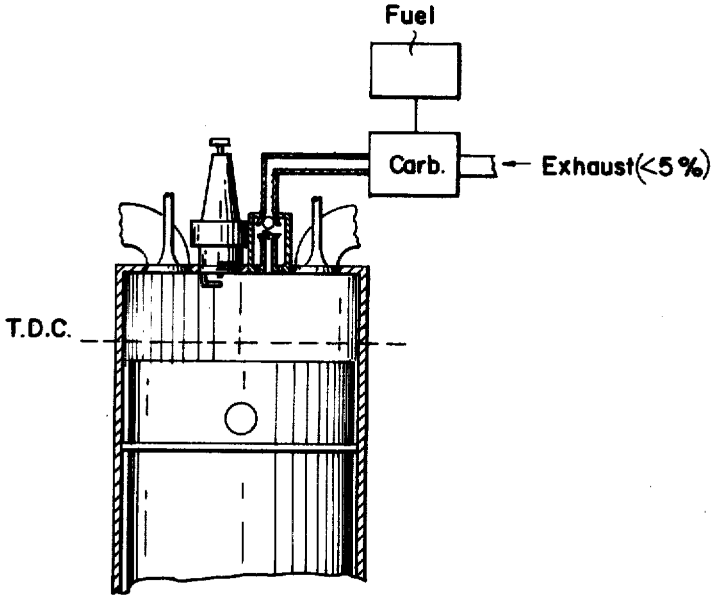

FIGS. 5*a*, 5*b*, 5*c*, 5*d*, 5*e*, 5*f*, 5*g*, 5*h*, 5*i*, 5*j* and 5*k* depict alternate techniques within the teachings of the present invention wherein the noxious NO reduction is done inside the working chamber wherein it is created in the first instance;

FIG. 5*a* shows liquid HC compounds being injected into the working chamber using conventional fuel injection techniques after the beginning of and during the expansion stroke of the working cylinder;

FIG. 5*b* shows alternate apparatus for introduction of HC compounds into the working cylinder following the initial explosion during the expansion stroke through the use of aperture pockets in the top of the piston;

FIG. 5*c* shows an alternate method wherein small cavities with orifice type communication are placed in the top of the working cylinder in the clearance volume area in a manner to facilitate distribution of unburned HC compounds in gaseous form following the initial explosion during the expansion stroke;

FIG. 5*d* shows a further alternate method somewhat similar to 5*c* wherein a cavity orifice arrangement is inserted in the top of the working cylinder in a manner to facilitate distribution of unburned HC compounds in gaseous form following the initial explosion during the expansion stroke;

FIG. 5*e* shows an alternate method where a cavity for capturing unburned HC compounds is connected to the working chamber by a venturi tube;

FIG. 5*f* is similar to FIG. 5*e* except that the cavity has hydrocarbon fuel added thereto to provide additional HC compounds to the gases leaving the cavity to the working cylinder;

FIG. 5*g* is similar to FIG. 5*e* and FIG. 5*f* in function and also supplies excess fuel;

FIG. 5*h* uses the working chamber as a reduction chamber for NO as does FIG. 5*a* through FIG. 5*g*, but accomplishes such reduction during the exhaust stroke rather than the expansion stroke by using the unburned HC scraped from the cylinder walls during the exhaust stroke and by using heated uncooled surface in the path of the exhaust gases, which surface is heated by the combustion gases;

FIGS. 5*i*, 5*j* and 5*k* show further alternate techniques and embodiments; and FIGS. 6–12 illustrate various other spark plug embodiments incorporating the inventive concepts of the present invention.

Figure 2:
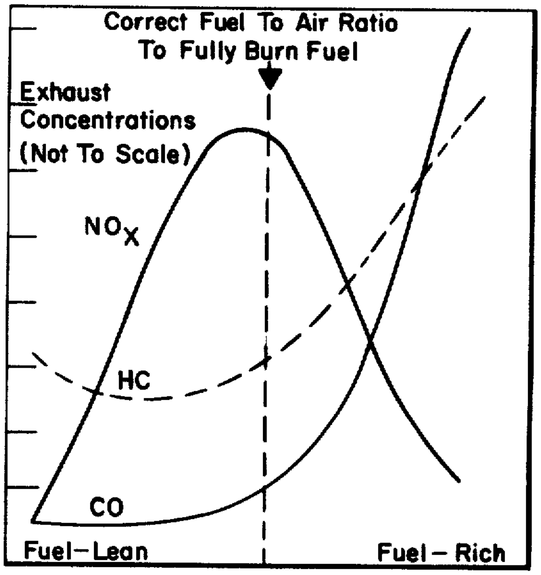
FIG. 2 is a simplified graph illustrating the composition of the exhaust products of the working cylinder of FIG. 1 for various fuel-to-air ratios for the purpose of illustrating the teachings of the present invention.

As indicated above, the generation of the noxious oxides of nitrogen in the products of combustion of hydrocarbon fuels is the most critical problem facing designers in controlling pollution from such combustion. FIG. 2 illustrates that the combustion must be in either the fuel-rich mode or in the fuel-lean mode to minimize the production of NO during combustion. Practical performance criteria appear to require that such combustion devices as the spark ignition internal combustion engine operate on the fuel-rich mode to reduce the production of NO to levels acceptable in the increasingly rigorous standards being applied. In fact, even then the exhaust must be subjected to a further NO reduction step followed by an HC and CO reduction step which have the many undesirable consequences set forth hereinabove. It is in that context that the present invention teaches that the reduction of NO of the exhaust to acceptable levels in combustion products in an acceptable time period requires that the exhaust be subjected to a temperature higher than would occur in the exhaust system outside the working chamber of the cylinders of the internal combustion engine as well as requiring (as known in the prior art) that the exhaust be oxygen starved and contain a substantial amount of HC compound in gaseous form and such does not require the presence of a catalyst known to be incompatible with those high temperatures.

Figure 1:
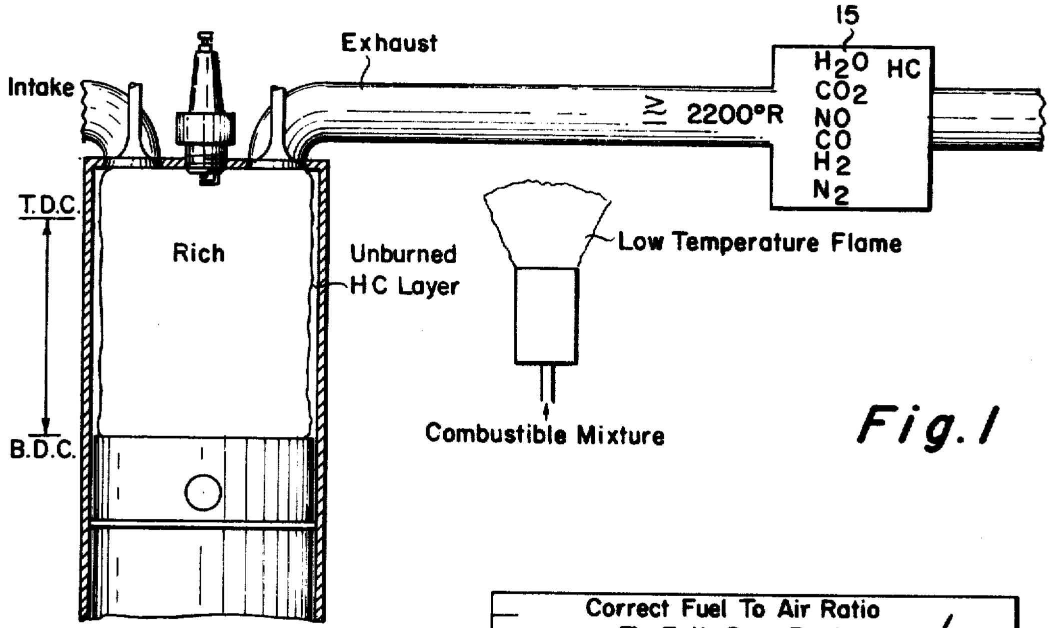
FIG. 1 is a simplified diagram of one of the working cylinders of a spark ignition internal combustion engine for the purpose of illustrating the teachings of the present invention.

Turning to FIG. 1, the working cylinder of a spark ignition internal combustion engine is shown with an indication that it is in the fuel-rich mode with its piston near bottom dead center (BDC) and commencing its exhaust stroke (the exhaust valve is about to open) with the energy expended gases at about 2600° Rankine. When the exhaust valve opens, the temperature of the energy expended gases left in the cylinder drops significantly to about 2000° Rankine and moves into the exhaust system at about one atmosphere to chamber 15 as shown. Theoretically, HC which was in gaseous form in the working cylinder during combustion was burned. However, as is well known to those skilled in the art, some HC compound is cooled by the cooled walls during combustion and is not available to be burned during the expansion stroke. Such HC compound is removed from the walls during the exhaust stroke, mixes with the hot exhaust gases and moves with the energy expended gases into the exhaust system and chamber 15 (along with $H_2O$, $CO_2$, and other products including the unwanted major pollutants NO and CO). This HC is shown in FIG. 2 as a dotted line to illustrate its status as other than a product of combustion. Since, as a practical matter, based on fuel mileage economics and technical problems such as oil dilution and carbon formation, it is not feasible to run so rich that the NO in the exhaust system is reduced to reach the increasingly rigorous standards, the chamber 15 may function as an NO reducing chamber to be followed by a second chamber (not shown) to reduce the remaining HC and CO. As stated above, the prior art would make chamber 15 a catalytic converter containing many catalytic surfaces to speed the reduction of NO back to $N_2$, etc. The catalytic converter technology known in the prior art recognizes the criticality of the presence of HC in gaseous form in the chamber 15 to speed up the NO reduction, but it is not known in the prior art that such HC is sufficient without a catalyst if the temperature of the gases within chamber 15 are maintained at temperatures near those present in the working cylinder just prior to opening of the exhaust valve. In FIG. 1, a heating means is shown depicting this principle. Such would (following the teachings of the present invention) heat the gases in chamber 15 to a temperature range of 2200°-2600° Rankine as determined by related time and chamber 15 volume considerations. In practice, the heating means would not be necessary if means were present to prevent the heat loss (and temperature drop) in the passage between the working cylinder and chamber 15. Alternatively the working cylinder itself may function as an NO reducing chamber following the initial explosion during the latter part of the expansion stroke prior to the opening of the exhaust valve providing HC compounds in gaseous form are injected into each working cylinder during the latter stages of the expansion stroke, thereby reducing the NO therein. This approach is described hereinafter in connection with FIGS. *5a, 5b, 5c, 5d, 5e, 5f, 5g, 5i, 5j* and *5k*. It is important to note that the aforementioned HC compound present near the cylinder walls and face of the piston in a low temperature condition is not available within the cylinder for the purpose of NO reduction during the expansion stroke. However, the technique of FIG. *5h* uses the HC compounds scraped from the cylinder walls during the exhaust stroke along with the uncooled heated surfaces in the path of the exhaust gases to reduce NO in the working chamber during the exhaust stroke.

Prior to the teachings of the present invention, as will be evidenced by review of the publications identified hereinabove, it was believed that in order to accomplish an NO reduction in a useful time a catalyst was necessary along with a reducing mixture of exhaust products. It was recognized that the fuel-air ratio had to be richer than stoichiometric to assure that it was oxygen poor and it was generally thought that the CO and $H_2$ were needed as reactants when the catalytic converter approach was used, but no one in the prior art recognized that a clear alternate method was available in that the NO reduction reaction could be accelerated by the addition of HC compounds as well as raising the temperature of the gases. By way of example, the temperature of the exhaust could be raised or maintained at a previously unexplored range of 2200°-2600° Rankine for a relatively short related time (100 - 10 milliseconds respectively), thereby removing the NO and at the same time not having to resort to the use of catalytic materials with all of their shortcomings relating to mechanical and chemical stability over the long periods of time operation required for successful operation of the equipment in its cleaning function. Great utility is attributed to this finding because the catalytic converter approach presents many engineering problems relating to reliability and economic problems relating to cost. Essentially, the teachings of the present invention represent the utilization of a discovery that the return of NO towards its equilibrium condition of $N_2$, etc. could be accelerated by an application of a temperature range to the gases of proper composition containing the NO and such could be done in a short time period available to process the exhaust gases determined by selecting the volume of the reducing chamber in accordance with the amount of pollutants emitted by the source of exhaust from the combustion of hydrocarbons such as the commerical internal combustion engine.

Figure 3:
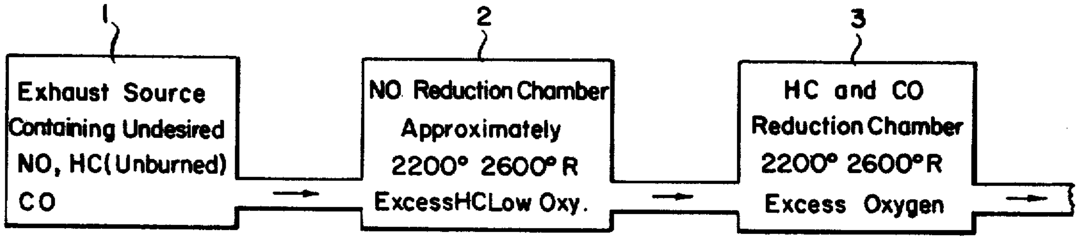
FIG. 3 is a block diagram illustrating the elements of the present invention in one rudimentary form as applied to any source of combustion products from hydrocarbon fuel.

Such is depicted in FIG. 3 wherein the exhaust from the exhaust source contains undesired oxides of nitrogen as well as excess HC compounds and CO wherein the presence of excess CO indicates a low oxygen condition for the succeeding reduction chamber 2. In the presence of excess hydrocarbons, some of which are used in chamber means 2, when the temperature in said chamber is maintained in a range indicated as approximately 2200°-2600° Rankine, for the related proper short time period, the NO in the exhaust therein is decreased to an acceptable level. If the exhaust from the source is not in the desired temperature range, means must be provided in the NO reduction chamber means 2 for providing the heat energy to the exhaust gas necessary to achieve that range.

The pressure and temperature of the exhaust in the chamber of chamber means 2 determines the mean exhaust density therein. The mass rate of exhaust from the pollution source 1 divided by the mean density in chamber means 2 multiplied by the selected reaction time determines the appropriate volume of the chamber in chamber means 2.

The temperature range indicated above is approximate in a design sense because of the large number of complex dependent variables involved. The teaching of the present invention is keyed on the rapid return toward equilibrium of the oxides of nitrogen when the exhaust products contain excess hydrocarbon compounds and is low in oxygen and are subjected to an elevated temperature beyond that heretofore recognized as having utility by others skilled in the art, but it is believed that when there are sufficient hydrocarbon compounds present to provide a sufficient number of molecular collisions (between NO and HC compounds) and sufficient heat energy present to provide the threshold energy, the reducing reaction takes place at a usefully rapid rate not heretofore recognized. It has been found that for spark ignition internal combustion engines exhausting approximately at one atmosphere pressure along with using a reasonable volume for the chamber 2 for automotive applications, a range of approximately 2200°-2600° Rankine is feasible and is related with a corresponding range of approximate time periods (100 - 10 milliseconds).

Modifications in applications even for spark ignition internal combustion engines may require or admit to other temperatures (which, of course, will be higher than those techniques requiring a catalyst for the same volume) and therefore time and pressure combinations other than quoted herein.

Referring again to FIG. 3, even though the NO reduction reaction in chamber 2 is dependent upon using the excess HC compounds, many of those products may remain following the reduction of the NO in accordance with the teachings of the present invention. Effectively, the exhaust coming from the chamber of reduction chamber means 2 is in about the same condition as that coming from the NO reduction catalytic converter of the prior art except that it is at a much higher temperature and as a part of the teachings of the present invention this fact provides a utility in HC and CO reduction chamber design not available to the prior art techniques because a more or less conventional oxidizing chamber with excess air added thereto can work much more efficiently at temperature exhaust ranges being provided to chamber 3 of FIG. 1. While in the present example the exhaust entering chamber 3 from chamber 2 is more than 2000° Rankine and therefore the HC and CO reduction can take place in both a reasonable volume and time consistent with present day automobile engine design, it should be noted that this temperature should never exceed 3300° Rankine since at that temperature there is danger of regeneration of the oxides of nitrogen which have been effectively eliminated in chamber 2 all in accordance with the teachings of the present invention.

While FIG. 3 is representative in a general sense of the teachings of the present invention, applications to the specific engine require, as a practical matter, further detailed apparatus to meet practical conditions. As noted, the application of the teachings of the present invention to an internal combustion engine requires that the exhaust flowing from source 1 to the NO reduction chamber of chamber means 2 be in a temperature range of approximately 2200°-2600° Rankine and contain excess hydrocarbon compounds and at the same time be low in oxygen. An internal combustion engine exhaust source which is operating at higher than stoichiometric can, of course, provide the excess hydrocarbon compounds and the low oxygen state but, as a practical matter, it may not be able to deliver the exhaust in the approximate temperature range desired. Under this condition, it may be desirable that chamber means 2 be constructed to include a prior combustion stage wherein the temperature of the exhaust is raised to the desired temperature range in a manner which is more sophisticated than that illustrated in FIG. 1.

Figure 4:
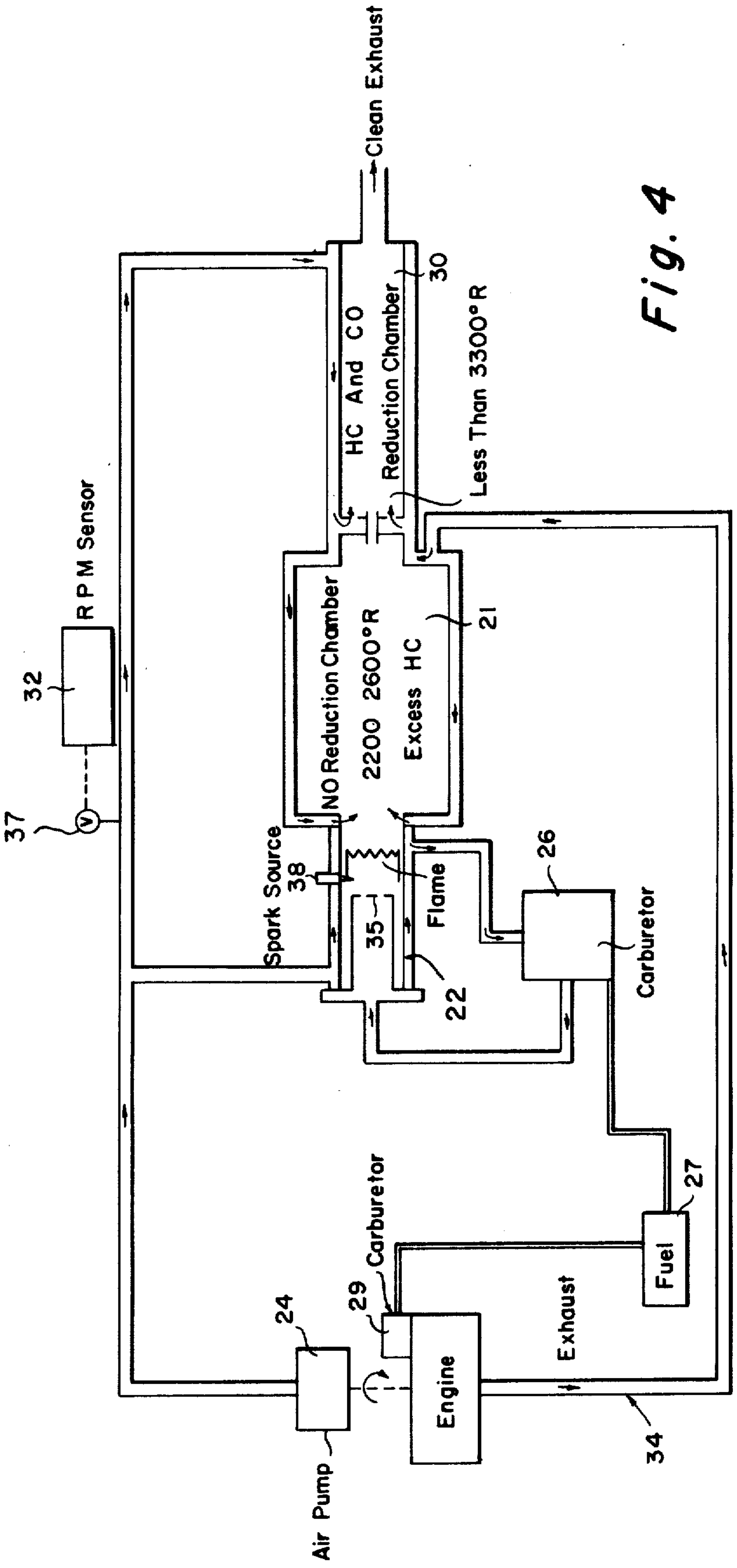
FIG. 4 is a more refined block diagram showing the reducing environment for controlling the oxides of nitrogen in a practical internal combustion engine environment followed by an oxidizing environment for eliminating the remaining hydrocarbons and carbon monoxide.

Referring to FIG. 4, the NO reduction chamber 21 therein is preceded by a combustion stage comprising a burner cavity 22 wherein fuel is burned after it is mixed with an appropriate amount of air (by passing through a carburetor 26) supplied from a conventional air pump source 24 to raise the temperature of the exhaust gases. Perforated plate means 35 is shown to function as a flame holder. During startup it is important that a spark source 38 be in operation in cavity 22 to initiate the flame.

The amount of fuel used by carburetor 26 will, of course, vary by the amount that is necessary to raise the temperature of the unmodified exhaust from the internal combustion engine as it enters NO reduction chamber 21 and the amount of fuel that is needed to maintain the oxygen starved mixture as well as the presence of unburned hydrocarbon compounds in the exhaust being subjected to NO reduction in reduction chamber 21.

It is important to note that the volume of reducing chamber 21 is determined by the mass rate of the exhaust divided by the mean density of the exhaust multiplied by the selected reaction period which is related to the temperature and the level of reduction of NO desired. The shape of reducing chamber 21 can be modified to a large degree to fit the physical constraints of the source of exhaust of hydrocarbon combustion with certain general limitations related to (1) warm up time, (2) external heat loss, (3) uniformity of flow and back pressure created, etc.

The approximate temperature range depicted in FIG. 4 for the gaseous contents of chamber 21 is appropriate for internal combustion engines. Other applications of the teachings of the present invention may use a different temperature range depending on the criteria used for selecting the volume of the reducing chamber.

The exhaust of FIG. 4 having been subjected to the NO reduction step will pass out chamber 21 and may contain excess HC compounds and will certainly contain unwanted CO and will in all likelihood exceed the rigorous pollution standards. Assuming such is the case, such pollutants can be removed by either a catalytic converter or thermal reactor techniques well known in the prior art.

The temperature of the exhaust from chamber 21 of FIG. 4 as shown may be near the upper operating temperature limit for catalytic converters (i.e., in excess of 2000° Rankine) and such high temperature may logically be deemed beneficial to the thermal reactor techniques. Accordingly, FIG. 4 shows chamber 21 exhausting into a thermal reactor identified as HC and CO reduction chamber 30 which mixes the HC compound and CO with air from air pump 24 thereby effecting an oxidation step resulting in conversion of those pollutants to $H_2O$ and $CO_2$. The design of oxidizing chamber 30 may embody known principles. However, the relative high temperature of the exhaust from the NO reduction chamber 21 following the teachings of the present invention enhances the oxidation process when that exhaust is combined with air. The temperature within the chamber 30 may be allowed to rise but no higher than about 3300° Rankine to avoid the regeneration of NO. As temperature of the exhaust rises in the presence of oxygen the time required for NO to reach its new prohibitively high equilibrium value decreases.

The range of temperatures legend on chamber 21 in FIG. 4 is intended as illustrative of the approximate range over which one design temperature may be selected for design purposes based on the best system economics. Once that temperature is selected it may be desirable to maintain the temperature of the exhaust within chamber 21 at that temperature over a wide range of operating conditions by automatic control means. In the absence of component and system deterioration, the rpm of the internal combustion engine is indicative of the exhaust temperature and such relationship provides the means to regulate the burners to provide the design temperature in chamber 21. Conventional flow divider means (such as a valve 37) is shown as mechanically responsive to conventional rpm sensing means 32 so that flow from air pump 24 to cavity 22 may be adjusted appropriately to control the heat supplied by the burner cavity 22. If a more direct control of temperature is required that temperature may be sampled by a more definitive manner using conventional techniques to adjust the flow's path via valve means 37 or equivalent flow control means. Alternatively, the temperature within chamber 21 might be allowed to vary over an acceptable range providing that NO restrictions are not violated. Spark source 38 may comprise a conventional spark plug with periodic reoccurring high voltage pulses being applied thereto in a conventional manner.

Hereinabove it was suggested that as a part of the teachings of the present invention each working cylinder of the internal combustion engine could function as an NO reducing chamber during the part of the expansion stroke following the high temperatures and high pressures accompanying the primary ignition of the combustible mixture and prior to the opening of its exhaust valve wherein HC compounds in gaseous form are effectively injected into the working chamber thereby reducing the NO produced therein. Referring now to FIG. 5*a* showing a working cylinder as that shown in FIG. 1 except that provision is included through conventional fuel injection means 50 wherein at the appropriate time fuel (HC compounds) is injected under sufficient pressure so that it can be dispersed within the working chamber so as to accelerate the NO reduction in accordance with the teachings of the present invention. Part and parcel with the teachings of the present invention, it should be recognized that the gases in the working chamber during the latter part of the expansion stroke are at a temperature slightly in excess of 2600° Rankine thereby causing continuous reduction of NO during the expansion stroke. The timing of the fuel injection as set forth hereinabove would, of course, be controlled following conventional fuel injection techniques now used by fuel injection internal combustion engines (i.e., the pulsing of metering valve 51). The method of using the working chamber of a working cylinder to reduce NO in accordance with the teachings of the present invention lends itself to many embodiments. Common to each embodiment, however, is the need for unburned gaseous HC compounds to be mixed with the gaseous products of combustion where the mixture is maintained at a temperature (for a related time period) elevated above that normally maintained in exhaust gases following the opening of the exhaust valve. Another example of a method is that shown in FIG. 5*b* wherein the face of the working piston is provided with aperture pockets 55 so as to capture HC compounds in gaseous form during the intake stroke and continue to hold said HC compounds during the compression stroke and during the high pressure portions of the expansion stroke at which point they become available as the unburned HC compounds needed for the NO reducing step at the high temperatures above and around 2600° Rankine during the latter part of the expansion stroke so that exhaust from the working chamber during the exhaust stroke contains a minimum of NO, but does contain the unwanted levels of HC compounds which have now been removed from the wall in gaseous form and also unwanted levels of CO. With the exhaust in this condition, it is in keeping with the teachings of the present invention that either the prior art catalytic oxidizing converter can be used or an oxidizing thermal reactor may be used to reduce the levels of HC and CO in the exhaust to the rigorous standards required by government regulations.

The amount of unburned HC compounds required to be in mixture with the products of combustion in the working cylinder at the elevated temperature is relatively small. However, the design of the embodiments disclosed herein as FIGS. 5*a* through 5*h* must take into account the possibility that the HC compounds intended to serve that purpose may be burned prior to accomplishing the purpose of reducing the oxides of nitrogen because they are present as a combustible mixture rather than being present in nonflammable form. The design of the aperture cavities 56 in FIG. 5*b* as to location, volume, number, shape, etc. will be determined by the need for capturing HC compounds during the intake and compression strokes and mixing them with the products of combustion during the expansion stroke so that the HC compounds are available in unburned form in intimate mixture with the products of combustion. The products of combustion created in the initial step of the expansion stroke can help keep the trapped HC compounds from burning by their early mixture with those HC compounds. Specifically, the products of combustion should pass into the aperture cavity 56 to change the nature of the entrapped gas to that of a non-flammable mixture so that unburned HC compounds will survive for distribution into the remaining products of combustion. It is anticipated that some of the entrapped hydrocarbon compound will be burned nevertheless and it is important that sufficient unburned HC compound be maintained in the ultimate oxygen-starved mixture of the products of combustion in which NO is to be reduced. One of the ways to assure this condition is to increase the volume optimally of the cavities and/or alternatively, optimally increase the fuel-rich mode of the fuel mixture being supplied to the working cylinder.

FIG. 5*c* is shown as still another way of providing the unburned hydrocarbons in the working cylinder following the explosion which commences the expansion stroke as indicated. Small cavities 56 are placed in the top of the working cylinder in the clearance area (above top dead center) in a manner to best facilitate the distribution of unburned HC compounds in gaseous form for the purpose of accelerating the reduction of NO generated in the high temperature and high pressure combustion atmosphere of the initial explosion. The location, volume and shape of said cavities 56 must be selected to facilitate the most intimate mixture of the unburned HC compounds with the products of a fuel rich hydrocarbon combustion represented by the initial explosion as well as maintain some HC in a nonflammable condition as aforesaid. It should be noted that the combustion of the initial explosion must create an oxygen-starved mixture.

To illustrate the broad teachings of the present invention, still another structure may be used to practice such teachings and such is illustrated in FIG. 5*d*. Therein a means containing a cavity 58 is inserted into an opening in the top of the working cylinder in a manner not unlike affixing a spark plug thereto (for example, via the use of threads). Through the face of cavity 58 are a plurality of apertures 60 for open communication between the cavity 58 and the working cylinder. During the compression stroke, the pressure differential will be such that the fuel mixture, including unburned hydrocarbon compounds in gaseous form, is forced into the cavity 58 through the orifices 60 and the high pressure condition at the top of the cylinder in the clearance volume is created inside the cavity 58. During the initial explosion of combustion the products of combustion are also forced into cavity 58 through orifices 60 such that much of the unburned HC compound therein is kept in an unburned condition because of the nonflammable mixture created. Following the initial explosion of combustion, the pressure of the gases in the cavity 58 is greater than that in the working cylinder because of the ever increasing volume within the working cylinder during the expansion stroke resulting in the dispersal of the gases rich in unburned hydrocarbon compounds into the oxygen-starved mixture in the working cylinder through the plural orifices 60 whereupon a reduction of the oxides of nitrogen takes place in the working cylinder following the initial stages of the expansion stroke because both the temperature and composition of the gases within the working chamber are conducive to that reduction. Following the expansion stroke, the exhaust containing excess and unwanted carbon monoxide and HC compounds may go through a special reduction chamber using techniques known in the prior art and identified hereinabove.

The use of a cavity to collect unburned HC compounds to aid in the NO reduction can take many forms, many of which can remain in open communication with the working chamber. FIG. 5e is illustrative of this principle. Therein cavity 61 includes a recessed portion remote from the working chamber wherein the entrance to the cavity has a reduced cross section to facilitate a venturi action through apertures 62 as will be hereinafter described. During the intake stroke, the fuel mixture will fill cavity 61 as well as the working chamber. During the compression stroke additional fuel mixture including HC compound is added to cavity 61. During the initial phase of the expansion stroke at the time of combustion the products of combustion are also forced into the cavity 61 displacing further the fuel mixture. Following the initial combustion in the expansion stage, however, the volume of the working chamber increases and the unburned gaseous HC compound preserved in cavity 61 passes through the venturi orifices 62 in unburned form thus facilitating the mixing of the unburned HC in the mixture with the combustion products which then leave the chamber and make intimate contact with the NO in the products of combustion within the working chamber. The optimum volume and shape of cavity 61 is determined by the need for optimum intermixing of the products of combustion with the fuel mixture therein during their exit from cavity 61 during the expansion stroke.

Reference is made to FIG. 5f. FIG. 5f is similar to FIG. 5e except that hydrocarbon fuel in liquid form is placed in the recessed portion of the cavity remote from the working chamber with respect to which the liquid hydrocarbon fuel can be of a low volatile type, such as oil. A check valve 65 between the cavity and the fuel source can be used to prevent gases in the cylinder from entering the liquid hydrocarbon fuel. The venturi fuel orifice 66 is shown as a different type than in the previous figure. During the intake and compression strokes, fuel mixture including HC compounds is compressed in the cavity 64. During the initial explosion of combustion of the expansion stroke, products of combustion are forced into cavity 64 and during the latter part of the expansion stroke as the volume of the working chamber is increased, the products of combustion followed by the fuel mixture contained in the cavity 64 is passed by the venturi such that liquid fuel from the remote portions of the cavity are injected into the gases exiting the cavity for mixing with the products of combustion in the working chamber to reduce the NO therein.

Referring now to FIG. 5g the cavity 71 for storing unburned HC compound is shown as in communication with the working chamber through a double acting ball check valve 72, a mixing tube 73 and mixing orifices 78, with additional fuel metering orifices 74. The ball check valve 72 in a first position is down, closing communication port tube 75 to the working chamber during the intake stroke of the piston, and in its second position closing communication port tube 76 to a liquid hydrocarbon fuel supply during the compression, expansion, and exhaust strokes of the piston. During the intake stroke based on a pressure differential through fuel metering orifice 74 fuel moves from liquid hydrocarbon fuel source 79 through open port tube 76, vaporizes and flows into mixing tube 73 and also into cavity 71. During the compression stroke the fuel mixture in the working chamber passes through open communication port tube 75 into mixing tube 73 and also into cavity 71 intermixing with the supplemental vaporized HC compound. During the initial combustion portion of the expansion stroke, the products of combustion pass through communication port tube 75 into mixing tube 73 and also into cavity 71 via plural mixing orifices 78 intermixing with the unburned HC compounds therein rendering a substantial amount nonflammable so that during the remaining portion of the expansion stroke such unburned gaseous HC compound returns to the working chamber to intermix with the remaining products of combustion to reduce the NO content thereof. The cross-section of communication path tube 76 is determined by the amount of supplemental vaporized HC compounds required within the working chamber during the expansion stroke following the explosion of combustion.

Hereinabove, the presence of HC compound on the walls of the working cylinder during the expansion stroke has been identified. Such HC compounds are not available for combustion in the expansion stroke because of their proximity to the cooled walls. Similarly such HC compounds are not available to provide the gaseous HC compounds for NO reduction following the initial explosion of combustion during the expansion stroke for the same reason. On the other hand, based on the teachings of the present invention those HC compounds which are scraped off the working cylinder walls during the exhaust stroke could be used in the working cylinder after the exhaust valve is opened during the exhaust stroke if the temperature of the products of combustion in the working cylinder were high enough. When the exhaust valve opens a substantial pressure and temperature drop occurs within the products of combustion remaining in the working cylinders during the exhaust stroke. Following the teachings of the present invention the temperature in the path of the products of combustion can be increased by placing one or more heated surfaces 80 in the clearance volume of the working cylinder of FIG. 5h adjacent the exhaust valve. By way of example, the heated surfaces 80 can be made of stainless steel as one or more rings pinned to the top or wall of the cylinder by techniques of those skilled in the art. The heated surfaces 80 are heated by the combustion process and function to heat the products of combustion during the exhaust stroke when the HC compounds (previously on the sides of the cylinder) are present for NO reduction.

FIGS. 1, 3 and 4 illustrate one general technique embodying the teachings of the present invention. FIGS. 5a through 5g illustrate another general technique embodying the teachings of the present invention. FIG. 5*h* illustrates still another general technique embodying the teachings of the present invention. It should be emphasized that any two or all three of these general techniques may be used simultaneously to effectuate a reduction of NO in particular applications.

The teachings of the present invention provide many benefits and accommodate themselves to many variations of apparatus for reducing the NO pollution in the products of hydrocarbon fuel combustion. It should be noted that when the embodiment of FIG. 4 is used, i.e., a separate source of HC compounds is used to raise the temperature of the exhaust out of the working cylinder and could be used as well as to assure a sufficient amount of excess HC compounds to accelerate the reduction of NO. Thus the principal source of the pollutants (the internal combustion engine) can operate on any fuel-to-air ratio desired by the overall design criteria. While the embodiment of the invention wherein the working chamber is used to reduce the NO the source must run at greater than stoichiometric ratio, such operation is entirely consistent with the most desired ratios for spark ignition internal combustion engines even prior to the great concerns and governmental regulations which have established the specifications that the pollutants NO, HC and CO have to be reduced according to rigorous standards.

The second or supplemental source of HC fuel when used to practice the teachings of the present invention need not be of the same high grade type as the fuel providing the power to the engine. Each of the major embodiments of the invention may be practiced by relatively simple modifications of existing engines. The second source of HC compounds when needed to practice the present invention does not represent a major compromise in terms of economy from that which is being required by prior art techniques to solve the same problem. The use of proper insulation in connection with the exhaust system following the combustion chamber can minimize the reheating cost of the exhaust products to reach appropriate reaction temperatures. Once an engine goes through an NO reduction stage followed by an HC and CO reduction stage, there is minimum need for further muffler components within the exhaust system. The teachings of the present invention have application to two stroke as well as four stroke engines. It should be quite clear to those skilled in the art that the teachings of the present invention may be applied to many engine types as well as the piston internal combustion engine, including the rotary types such as the turbine and the Wankel. In the turbine type the NO reduction chamber would be external to the "working chamber", whereas in the Wankel the NO reduction chamber could be either inside or outside of the combustion chamber means.

It also should follow that the teachings of the present invention can apply to the fuel injection internal combustion engine type such as the diesel. While the diesel would be required to run in a slightly richer than stoichiometric mode resulting in a modest increase of fuel consumption, the fuel injection apparatus for providing the gaseous HC compounds is already a part of the apparatus. The fuel injection system would merely have to be altered in timing so that the second but smaller injection of HC compounds occurred after the initial explosion during the expansion stroke.

The teachings of the present invention also apply to control the products of hydrocarbon fuel combustion in the field of heating and electrical generating plants. As a matter of fact, the second source of heating for NO reduction outside of the primary combustion chamber can be minimized since elaborate heat exchange apparatus can be developed on the basis that space associated with the combustion source is not at a premium. Using the teachings of the present invention the power plant can be located nearer cities or users with the resultant gain in cost reduction of transmission.

The teachings of the present invention are even usable in association with sources of hydrocarbon fuel combustion in home units of both the mobile and fixed type.

Other uses and teachings of the present invention will be apparent to those skilled in the art. Moreover, modifications may be made in the apparatus and techniques disclosed herein by substituting a wide range of equivalents known to one skilled in the art without departing from the teachings of the present invention.

To illustrate the further variations of the teachings of the present invention reference is made to FIG. 5*i* in which the design of a conventional type spark plug is modified to provide a cavity 82 around the bottom of the spark plug with one or more access apertures 83 developing a functional relationship to the apparatus illustrated in FIG. 5*d* as a screw-in cavity unit. The location of the cavity 82 and orifice 83 immediately adjacent the spark plug is in fact beneficial in that this is the location of the hottest spot within the working chamber during the expansion stroke and therefore where more of the NO would normally be generated. The cavity 82 and apertures 83 are of different design than found on spark plugs of conventional design including the so-called ring fire type. The volume and shape of the cavity 82 and the number and size of each aperture 83 must be carefully selected so that during the intake and compression strokes fuel mixture is forced into the cavity 82 in amount so that sufficient HC compound may be stored therein to be intermixed with products of combustion from the working chamber during the initial explosion of combustion such that a substantial amount of the aforesaid stored HC compounds are rendered nonflammable and are available to be spewed out into the working chamber during the remaining portion of the expansion stroke for intermixing with the remaining products of combustion as unburned gaseous HC compounds to effect a reduction of NO in that oxygen starved environment within the related reaction time and volume associated therewith.

FIG. 5*j* as illustrated functions in a manner similar to the spark plug apparatus illustrated in FIG. 5*i* except that a supplemental fuel supply 85 is connected through a biased check valve 86 to supply (via fuel delivery tube 87) HC compound to cavity 88 during the intake stroke of the piston thereby assuring the presence of sufficient HC compound in providing a supply of unburned HC compound for intermixing with the oxygen-starved products of combustion during the expansion stroke following the initial explosion of combustion to effect a reduction of NO in that oxygen-starved environment within the related reaction time and volume associated therewith. Spring loaded ball type check valve 86 is open only during the intake stroke.

FIG. 5*k* illustrates an embodiment similar to that shown in FIG. 5*g* except that the mixing tube is removed and the supplemental HC fuel supply is mixed with the products of combustion from the exhaust system. The products of combustion being oxygen poor eliminate the need for a mixing tube by rendering the stored HC compound nonflammable for later use as unburned HC compound during the expansion stroke following the initial explosion of combustion. As will be clear from the teachings of the present invention, any of the supplemental fuel techniques described herein may be used with a cavity physically integrated with the spark plug structure in accordance with FIG. 5*i* to provide NO reduction in accordance with the teachings of the present invention. Moreover, as a part of the teachings of the present invention the supplemental fuel techniques can be combined with the general technique described in connection with FIG. 5*h* by supplementing the HC compound scraped from the working cylinder.

It is apparent from these teachings that to treat the exhaust from a combustion source which is fuel-lean containing unwanted NO, it would be necessary to first add enough unburned hydrocarbons and promote combustion so the resulting products would be those that would be present in a fuel-rich combustion source and then add unburned hydrocarbons to effect the reduction of unwanted NO. As a matter of practice it is also apparent that this two-step process in fact occurs if the same amount of total unburned hydrocarbons is added to the exhaust products of combustion in the first instance and combustion promoted.

FIGS. 6–12 disclose various spark plug embodiments similar to those of FIGS. 5*i* and 5*j*, wherein the hydrocarbon storage chamber is formed as part of the spark plug means for removable connection with the threaded cylinder wall opening, thereby affording the capability of retrofit on existing internal combustion engines.

In the dual plate embodiment of FIG. 6, a plurality of annular apertured plates represented by a pair of plates 100 and 102 are mounted coaxially upon the porcelain insulator member 104 to define in the annular space between the insulator member and the outer electrode 106 the storage cavity 108. During the compression stroke of the engine, unburned hydrocarbons are supplied from the cylinder to the storage cavity via the staggered apertures contained in the plates 100 and 102. Owing to the isolation of the storage cavity from the cylinder by the apertures and also to lower temperature of the storage cavity owing to its remoteness from the cylinder, the unburned hydrocarbons are stored in the cavity 108 until ignition of the fuel has been completed in the cylinder, whereupon during the power stroke of the engine, the unburned hydrocarbons are resupplied to the cylinder to effect reduction of the undesirable oxides of nitrogen (since the temperature, time and volume conditions in the cylinder are now suitable for efficient reduction of the oxides of nitrogen). If desired, fuel may be directly inserted into the storage cavity by the fuel injection means 110.

In the embodiment of FIG. 7, the annular storage cavity 116 is defined between the insulator 118 and the outer electrode 120 in a portion of the spark plug means remote from the threaded portion 120*a* of the outer electrode 120, whereby the cavity is isolated from the engine cylinder and is at a desirably lower temperature. Consequently, ignition of the hydrocarbons stored in cavity 116 is avoided at the time of ignition of the fuel in the cylinder. Unburned hydrocarbons are supplied to and from the storage cavity 116 via one or more longitudinal through bores 122 contained in the outer electrode 120. If desired, fuel injector means may be provided for introducing unburned hydrocarbons into the cavity 116.

In the embodiment of FIG. 8, a groove 130 is formed in the outer peripheral surface of the outer electrode 132 between the threaded portion 132*a* and the enlarged portion 132*b* that compresses the gasket seal 134 upon the outer surface of the cylinder head. In this embodiment, generally longitudinally extending grooves 136 formed in the threaded portion 132*a* afford communication between the cylinder and the storage cavity 131 defined by groove 130 and the annular space within gasket 134. If desired, fuel may be injected into the cavity from conventional fuel injector means.

In the embodiment of FIG. 8, the groove 130 has been illustrated as being formed in the spark plug, but it is apparent that, if desired, a similar groove could be formed in the corresponding portion of the threaded bore of the cylinder head, either in conjunction with or as an alternative to the groove 130, thereby affording means for controlling the size of the storage cavity.

In the embodiment of FIG. 9, an annular sleeve 140 is mounted concentrically on the outer electrode 142 between the threaded portion 142*a* and the enlarged portion 142*b*. Gaskets 146 and 148 are compressed between the sleeve 140 and the enlarged outer electrode portion and the cylinder head, respectively, whereby the annular storage cavity 150 is defined between the sleeve and the outer electrode member. Longitudinal grooves 152 contained in the threaded portion 142*a* afford communication between the storage cavity 150 and the cylinder of the internal combustion engine.

As shown in FIG. 10, the inner peripheral surface of the sleeve 160 may be provided with an annular recess 162 for enlarging the effective size of the cavity 164. Thus the depth and width of the recess 162 afford means for controlling the size of the storage cavity. In order to increase the distribution and efficiency of the hydrocarbons in the storage chamber, the recess may be filled with a porous mass 166, such as sintered bronze, as shown in FIG. 11, thereby to afford a filtering effect on the fuel.

Referring now to the embodiment of FIG. 12, the storage cavity 170 is formed as a circular groove or recess contained within the face of the enlarged portion 172*a* of the spark plug outer electrode 172. The outer diameter of the groove 170 is less than the diameter of the gasket seal 174 that is compressed between the enlarged electrode portion 172*a* and the cylinder head. Communication between the storage cavity and the cylinder is afforded by the longitudinal grooves 176 formed in the outer periphery of the screw-threaded portion 172*b* of the outer electrode.

In any of the spark plug embodiments, fuel injection means may or may not be provided, if desired, for supplying a quantity of fuel from a separate source to the storage cavity.

While the preferred forms and embodiments of the invention have been illustrated and described, various modifications may be made without deviating from the inventive concepts set forth herein.

What is claimed is:

1. In a hydrocarbon-fueled combustion device wherein oxygen-starved combustion products contain an excess of nitrogen oxide relative to an equilibrium value defined by the pressure, temperature and composition parameters of said products of combustion, the improvement which consists of: a source of unburned hydrocarbon, mixing means for producing a mixture of said oxygen-starved combustion products and a quantity of unburned hydrocarbon from said source, and means for maintaining said mixture at a temperature of at least 2200 degrees Rankine thereby reducing the level of nitrogen oxide toward its equilibrium value.

2. Apparatus as defined in claim 1, wherein said hydrocarbon fueled combustion device is an internal combustion engine having a combustion chamber; and further wherein said mixing means and said source of unburned hydrocarbon consists of a storage chamber having an orifice in communication with said combustion chamber, whereby, in succession, during the compression stroke of the engine hydrocarbons are stored in an unburned condition in the storage chamber, following ignition the products of combustion are mixed with the stored hydrocarbons to render the hydrocarbons nonflammable, and during the expansion stroke the unburned hydrocarbons are returned to the combustion chamber.

3. Apparatus as defined in claim 2, wherein said internal combustion engine includes a spark plug having electrodes forming a spark gap, said orifice of said storage chamber being positioned immediately adjacent said spark plug gap.

4. Apparatus as defined in claim 2, wherein said internal combustion engine includes a piston, said storage chamber and said orifice being contained in said piston.

5. Apparatus as defined in claim 1, wherein said mixture of unburned hydrocarbon and combustion products is initially at a temperature less than 2200 degrees Rankine, and said means for maintaining said temperature includes heating means for raising the temperature of said mixture to a temperature of at least 2200 degrees Rankine.

6. Apparatus as defined in claim 5, wherein said hydrocarbonfueled combustion device comprises an internal combustion engine having a combustion chamber with an intake port and exhaust port, said heating means comprising a heat retaining element positioned adjacent said exhaust port.

7. Apparatus as defined in claim 1, wherein said hydrocarbon fueled combustion device is an internal combustion engine having a combustion chamber; and further wherein said mixing means comprises means (50,51) for injecting fuel into said combustion chamber during the expansion stroke the engine following combustion.

8. The method for reducing the oxides of nitrogen contained in the oxygen-starved combustion products of a hydrocarbon fuel combustion device, said oxides of nitrogen having an excess concentration relative to an equilibrium value defined by the pressure temperature and composition parameters of said products of combustion, which consists of (a) mixing with said oxygen-starved combustion products a given quantity of hydrocarbon at a time when the oxides of nitrogen exceed the equilibrium value; and (b) maintaining the resultant mixture at a temperature of at least 2200 degrees Rankine for a period of time to effect a desired accelerated reduction of the oxides of nitrogen toward the equilibrium value.

9. The method for reducing the oxides of nitrogen contained in the oxygen-starved combustion products of an internal combustion engine of the piston and cylinder type, said oxides of nitrogen having an excess concentration relative to an equilibrium value defined by the pressure, temperature and composition parameters of said products of combustion, which comprises (a) storing in an unignited condition in a storage chamber in communication with the combustion chamber a portion of the air-fuel charge of said engine, thereby to define a given quantity of hydrocarbon;

(b) igniting the unstored portion of the air-fuel charge in the combustion chamber to create combustion products which mix with and render nonflammable the stored charge portion;

(c) subsequently introducing the stored charge portion in the non-flammable condition into the combustion chamber during the expansion stroke of said engine, thereby to mix with said oxygen-starved combustion products said given quantity of hydrocarbon at a time when the oxides of nitrogen exceed the equilibrium value and (d) maintaining the resultant mixture at a temperature of at least 2200° Rankine for a period of time to effect a desired accelerated reduction of the oxides of nitrogen toward the equilibrium value.

10. The method as defined in claim 9, and further including the step of storing unburned HC compounds from a supplemental source along with a portion of the fuel mixture otherwise used for the combustion within the container volume.

11. Apparatus for reducing the oxides of nitrogen contained in the oxygen-starved combustion products of an internal combustion engine of the piston and cylinder type, the oxides of nitrogen having an excess concentration relative to an equilibrium value defined by the presence, temperature and composition parameters of said products of combustion, comprising (a) means for mixing a given quantity of hydrocarbon, at a time when the oxides of nitrogen exceed the equilibrium value, with said oxygen-starved combustion products;

(b) said internal combustion engine being operable to define means for heating the resultant mixture at a temperature of at least 2200° Rankine for a period of time to effect a desired accelerated reduction of the oxides of nitrogen toward the equilibrium value;

(c) said mixing means comprising means defining on at least one of the piston and cylinder components of said engine at least one storage chamber arranged to receive unburned hydrocarbon during intake and compression strokes of said piston, said storage chamber being in communication with said cylinder via an orifice of such a size relative to the chamber that at the time of combustion of the fuel in said cylinder, the combustion gases are introduced into the storage chamber without ignition of the hydrocarbon component thereof;

(d) said storage chamber and said orifice defining means being operable during the expansion stroke following combustion for emitting the unburned hydrocarbon from the storage chamber for mixing with the products of combustion to reduce the oxides of nitrogen contained therein.

12. Apparatus as defined in claim 11, wherein said storage chamber is defined in the working face of said piston.

13. Apparatus as defined in claim 11, wherein said storage chamber-defining means is contained within the cylinder in the clearance space above top dead center.

14. Apparatus as defined in claim 11, wherein said storage chamber-defining means is mounted on said cylinder externally of and in communication with the combustion chamber of said cylinder.

15. Apparatus as defined in claim 11, and further including venturi means connected at one end with said orifice and extening coaxially therefrom into said chamber for initially receiving the unburned hydrocarbon and for subsequently receiving the combustion products that displace said unburned hydrocarbon in the protion of said chamber surrounding said venturi means, said venturi means containing metering passages which cause the unburned hydrocarbons to mix with the products of combustion when they re-emerge from the chamber during the expansion stroke.

16. A spark plug adapted for mounting at one end in an opening contained in the cylinder head of an internal combustion engine that is operable to produce combustion gases containing oxides of nitrogen having an excess concentration relative to an equilibrium value defined by the pressure, temperature and composition parameters of the products of combustion, said spark plug including successive concentrically arranged inner electrode, tubular insulator and tubular outer electrode members, respectively, said outer electrode member including an externally threaded portion adapted for threaded mounting in said cylinder head opening, the improvement wherein said spark plug means further comprises:

(a) means defining in said spark plug a storage cavity remote from the cylinder when said spark plug is threadably mounted in the cylinder head opening; and (b) passage means affording continuous communication between said storage cavity and the cylinder of said engine, said passage means terminating at one end adjacent the cylinder in an orifice;

(c) said storage cavity and said passage means having a predetermined total volume relative to the volume of said cylinder for storing a given quantity of unburnt hydrocarbons during the compression stroke of the engine, whereby during the subsequent expansion stroke of the engine following ignition, the unburnt hydrocarbons are returned to the cylinder for mixing with the combustion gases at a temperature of at least 2200 degrees Rankine to reduce the oxides of nitrogen content of the gases toward their equilibrium value.

17. Apparatus as defined in claim 16, wherein said insulator member has a configuration defining at said one spark plug end an annular spark plug cavity arranged concentrically between the inner and outer electrodes adjacent the cylinder of the internal combustion engine.

18. Apparatus as defined in claim 16, wherein said storage cavity defining means comprises at least one annular plate mounted at said one end of said spark plug means concentrically between said insulator and said outer electrode members, said plate containing a plurality of apertures that define said passage means, whereby said spark plug cavity defines said storage cavity.

19. Apparatus as defined in claim 18, and further including at least one additional annular plate mounted concentrically about said insulator member parallel with said one annular plate, each of said additional plates containing a plurality of apertures arranged in staggered relation relative to the apertures contained in said one plate, whereby both said plates isolate said storage cavity from said cylinder.

20. A spark plug means adapted for mounting at one end in an opening contained in the cylinder head of an internal combustion engine that is operable to produce oxygen-starved combustion gases containing oxides of nitrogen having an excess concentration relative to an equilibrium value defined by the pressure, temperature and composition parameters of the products of combustion, said spark plug means including successive concentrically arranged inner electrode, tubular insulator and tubular outer electrode members, respectively, said outer electrode member including an externally threaded portion adapted for threaded mounting in said cylinder head opening, the improvement wherein said spark plug means further comprises (a) means defining in said spark plug means a storage cavity remote from the cylinder when said spark plug means is threadably mounted in the cylinder head opening, said storage cavity also being arranged above said threaded portion and remote from said one spark plug end; and (b) passage means affording continuous communication between said storage cavity and the cylinder of said engine, said passage means terminating at one end adjacent the cylinder in an orifice;

(c) said storage cavity and said passage means having a predetermined total volume relative to the volume of said cylinder for storing a given quantity of unburnt hydrocarbons during the compression stroke of the engine, whereby during the subsequent expansion stroke of the engine following ignition, the unburnt hydrocarbons are returned to the cylinder for mixing with the combustion gases at a temperature of at least 2200 degrees Rankine to reduce the oxides of nitrogen content of the gases toward their equilibrium value.

21. Apparatus as defined in claim 20, wherein said storage cavity cmprises a cavity contained between said insulator and outer electrode members, and further wherein said passage means comprises a longitudinal bore contained in said outer electrode member and extending longitudinally thereof from said one end to said storage cavity.

22. Apparatus as defined in claim 20, wherein said outer electrode includes an enlarged portion, said spark plug means further including annular gasket means mounted concentrically on said outer electrode member for sealed engagement between said outer electrode enlarged portion and said cylinder head when said spark plug means is connected in said cylinder head opening.

23. Apparatus as defined in claim 22, and further wherein said cavity means comprises an annular groove contained in the outer periphery of said outer electrode member intermediate said gasket means and said threaded portion; said passage means comprising at least one groove contained in and extending longitudinally the length of said threaded portion.

24. In a spark plug means adapted for mounting at one end in an opening contained in the cylinder head of an internal combustion engine for producing combustion gases containing oxides of nitrogen having an excess concentration relative to an equilibrium value defined by the pressure, temperature and compsotion parameters of the products of combustion, said spark plug means including concentrically spaced inner electrode and tubular outer electrodes between which is arranged a tubular insulator, said outer electrode member including at one end an externally threaded portion adapted for threaded mounting in said cylinder head opening, the improvement wherein said spark plug means further comprises (a) means defining a storage cavity remote from the cylinder when said spark plug means is threadably mounted in the cylinder head opening, said outer electrode having an enlarged head portion remote from the threaded end portion, and a reduced neck portion between said enlarged head and threaded end portions, said storage cavity defining means comprising an annular sleeve member arranged concentrically in spaced relation about said reduced neck portion, and gasket means arranged for compression between said sleeve member and said enlarged head portion and said cylinder head, respectively, thereby to seal the annular storage cavity defined between said reduced neck portion and said sleeve member; and (b) passage means affording communication between the cylinder and said storage cavity, said passage means comprising at least one groove contained in and extending longitudinally the length of the threaded portion, whereby during a compression stroke of the internal combustion engine, a quantity of unburnt hydrocarbon is supplied to the storage cavity during the compression stroke of the engine, which hydrocarbon is subsequently returned to the cylinder after ignition during the expansion stroke to reduce at a temperature of at least 2000 degrees Rankine the oxides of nitrogen toward their equilibrium value.

25. Apparatus as defined in claim 24, wherein said sleeve member contains on its inner periphery a hollow space, whereby the size of the hollow space is a factor with respect to the size of said storage cavity.

* * * * *